INVENTOR
RALPH R. TURNER
BY Francis J. Klempay
ATTORNEY

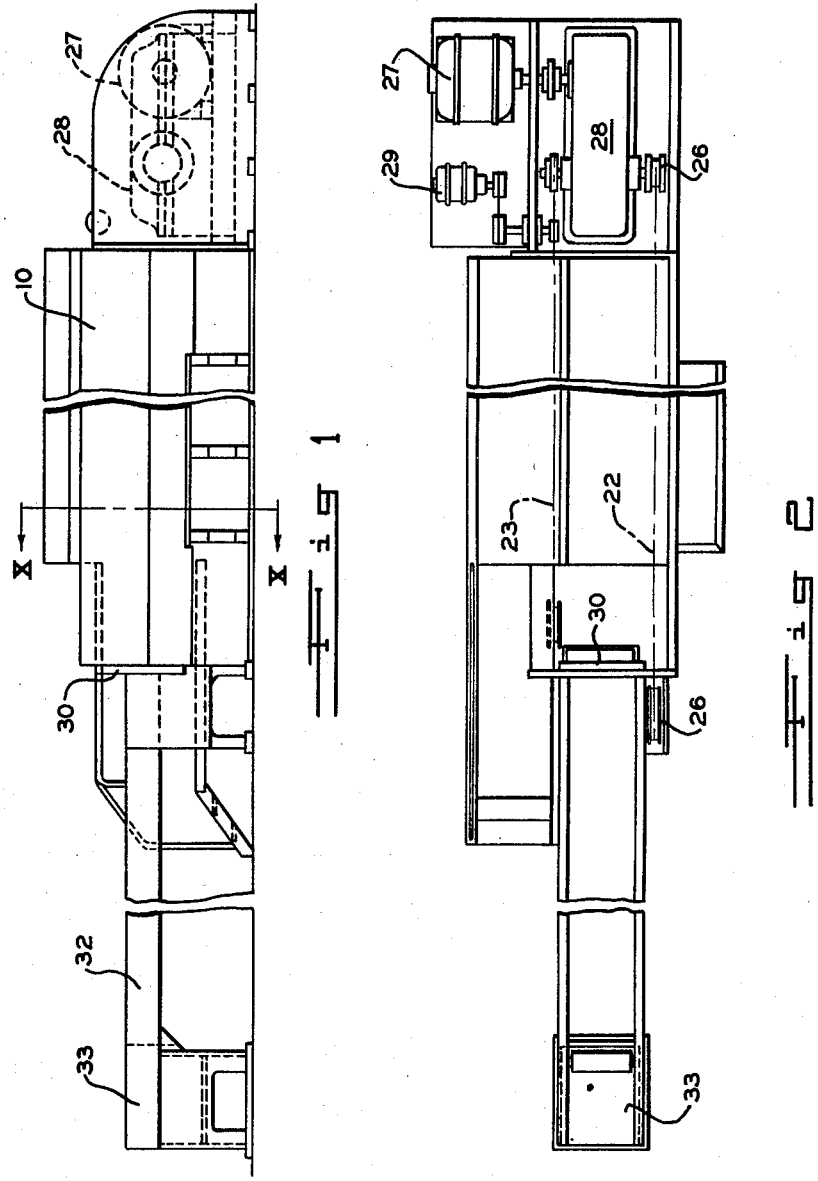

Aug. 4, 1959

R. R. TURNER 2,897,957

EJECTOR FOR GRIPPER JAWS

Filed May 17, 1954

INVENTOR
RALPH R. TURNER

BY Francis J. Kleinpas
ATTORNEY

Aug. 4, 1959

R. R. TURNER 2,897,957

EJECTOR FOR GRIPPER JAWS

Filed May 17, 1954

INVENTOR
RALPH R. TURNER

BY *Francis J. Klempay*

ATTORNEY

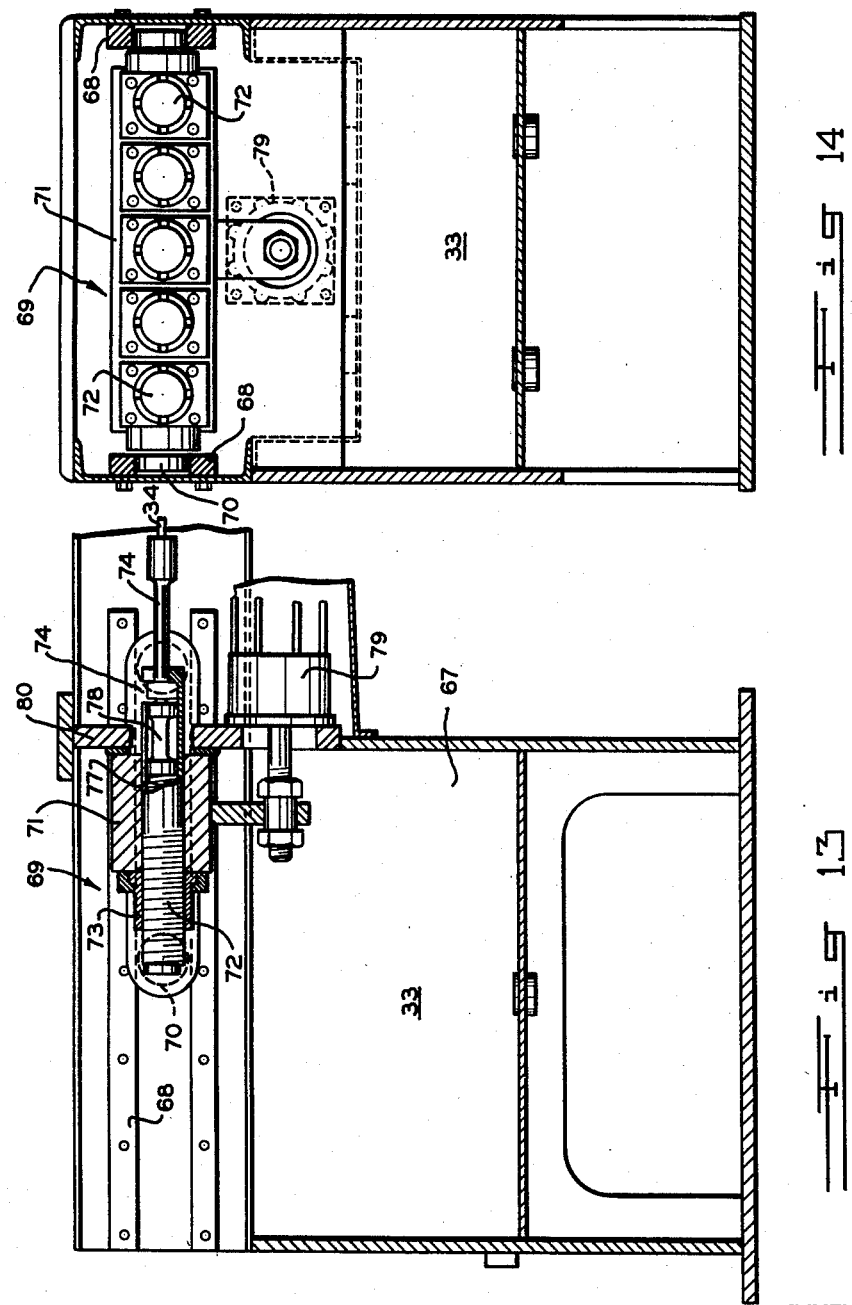

United States Patent Office 2,897,957
Patented Aug. 4, 1959

2,897,957

EJECTOR FOR GRIPPER JAWS

Ralph R. Turner, Warwick Neck, R.I., assignor to Lombard Corporation, Youngstown, Ohio, a corporation of Ohio Application May 17, 1954, Serial No. 430,122

4 Claims. (Cl. 205—24)

The present invention relates to drawbench apparatus, and more particularly to improvements in such apparatus having the effect of rendering the same more suitable for performing a plurality of simultaneous drawing operations.

As an overall object the present invention seeks to provide a drawbench assembly having a number of improved features whereby the apparatus is adapted for performing a plurality of simultaneous tube drawing operations, for example, in a more expeditious manner than with apparatus of heretofore known design and construction.

As a more specific object, the invention disclosed herein seeks to provide an improved multi-tube drawbench assembly haivng a relatively large draw carriage for accommodating a plurality of blanks or workpieces in side-by-side relation and having a pair of spaced draw chains for propelling the carriage, which is characterized by an improved and novel arrangement for engaging the carriage and draw chains so that both chains are equally loaded during a drawing operation, and further so that there is no tendency for the draw chains to skew the carriage with respect to the trackway provided therefor.

Further, to the above, it is proposed by the present invention to provide a draw carriage device having means at each side thereof for engaging the spaced draw chains, and having a pivotally mounted equalizer bar or yoke whereby any tendencies for the draw chains to assume unequal loads is absorbed in the equalized bar and a uniform balanced draw force is applied to the carriage.

It is a common occurrence in the drawing of tubes and rods for the same to jump forwardly with substantial force as the trailing end thereof passes through the die, the obvious reason, of course, being that the blanks are under substantial tension throughout the drawing operation, and the sudden release of such tension is occasioned by the sudden release of a substantial amount of energy which propels the blanks forwardly with considerable force. In the drawing of small tubes, for example, this is a considerable problem in that the forward ends of the blanks are driven with substantial force against the draw carriage, and often the newly drawn tubes are thereby buckled and rendered unsuitable, or partially so. To avoid these undesirable results it has been heretofore proposed to deflect the forward ends of the tube blanks out of the carriage, immediately following the completion of the draw and before the blanks have jumped forward far enough to engage any solid portions of the draw carriage. By this arrangement the rapidly moving tube blanks are permitted to "run out" their kinetic energy, and this cause of spoilage is effectively eliminated.

It is one of the objects of the present invention to provide in a drawbench assembly certain innovations in draw carriage and gripper construction whereby deflection of the forward ends of the tube blanks out of the draw carriage following a drawing operation may be carried out in an improved manner than has been heretofore possible.

More specifically, the above object contemplates the provision in a draw carriage assembly of a plurality of pneumatically operated gripper mechanisms, each including an ejector mechanism of novel construction which is linked mechanically with the gripper jaws whereby upon completion of a drawing operation the gripper jaws are opened and the ejectors operated by the force of the tubes, but with a pneumatically cushioned action so that damage to the carriage and gripper parts and/or the tube blanks is avoided.

A further object of the invention is the provision in a drawbench assembly of improved means for engaging and gripping the stock pieces to be drawn, including a novel actuating arrangement therefore which, among other advantages, has particular adaptability to multi-draw operations.

Yet another object of the invention is the provision in a drawbench assembly for performing a plurality of simultaneous drawing operations of an improved arrangement for mounting and anchoring a plurality of mandrel rods whereby loading and unloading of the bench is facilitated and rapid adjustment of the mandrels, individually, is afforded.

The above and other objects and advantages of the invention will become apparent upon full consideration of the following detailed specification and accompanying drawings wherein is shown a preferred embodiment of the invention.

In the drawing:

Figure 1 is a side elevation of a drawbench assembly constructed in accordance with the teachings of my invention;

Figure 2 is a top plan view of the apparatus of Figure 1;

Figures 13 and 14 are section views taken along lines XIII—XIII and XIV—XIV respectively of Figure 12.

Figure 10:
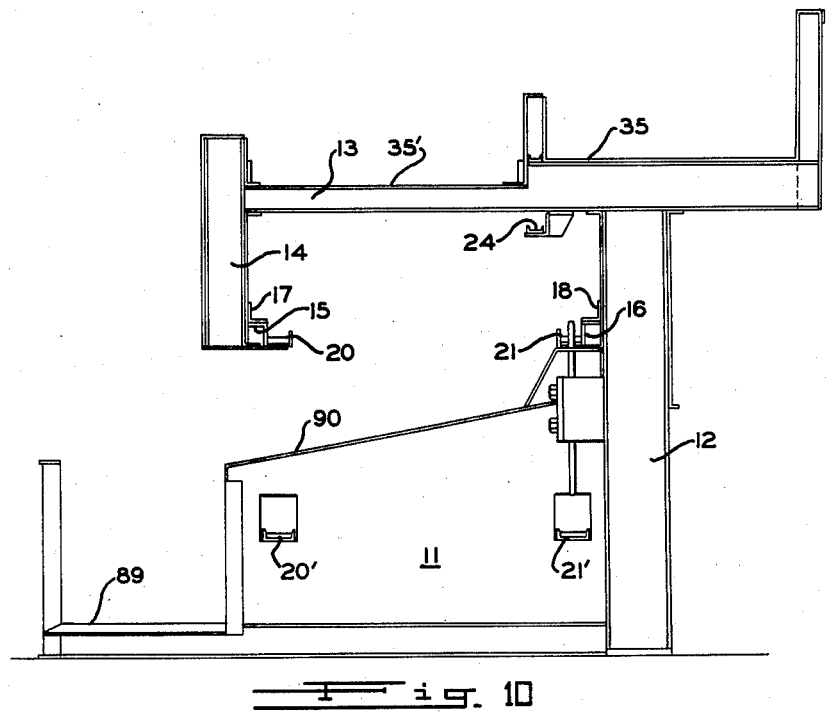
Figure 10 is a section view of the framework of my drawbench assembly, taken along line X—X of Figure 1.

Referring now to the drawings, the numeral 10, in Figure 1, represents generally the main framework of my drawbench assembly which is comprised of a plurality of frame sections 11, as shown in Figure 10. The frame sections 11 may be fabricated of ordinary structural members, including an upright member 12 and a horizontally disposed cantilever beam 13 extending forwardly of the upright member or post 12. Depending downwardly from the forward outer end of the cantilever beam 13 is a short beam section 14, which carries at its lower end a track support 15. The support 15 is one of a complementary pair, a second support 16 being carried by the post 12, as shown.

In the complete drawbench assembly there are a plurality of frame sections 11, mounted in spaced relation. And carried by the plurality of supports 15 and 16 of such sections are spaced tracks 17 and 18, which may be elongated sections of angle iron, for example. The tracks 17 and 18 both support and guide a draw carriage 19 in longitudinal movement throughout the length of the drawbench, as will be subsequently developed herein.

Adjacent and slightly below each of the track supports 15 and 16 are guiding and supporting channels 20 and 21 for a pair of widely spaced draw chains 22 and 23 which are employed to draw the carriage 19 along its guided path during a drawing operation, as will be more fully described.

Supported in depending relation from the cantilever member 13 is another channel 24 which guides and supports a third chain 25 which is utilized in the illustrated apparatus as a "return" chain, for returning the carriage 19 to its initial position immediately following a drawing operation.

In accordance with preferred practice, the main draw chains are endless and rotate continuously in one direction. Therefore suitable sprocket wheels 26 (see Figure 1) are provided at each end of the respective traverses of the chains 22 and 23, and additional guiding and supporting channels 20' and 21' are provided in the lower part of the framework so that the lower or return reaches of the drive chains may be properly supported.

At the right-hand end of the drawbench assembly there is provided a heavy duty drive motor 27 and gear reducer 28, the latter of which has driving connection with the chains 22 and 23 for effecting synchronous movement thereof in the manner desired. And in the illustrated apparatus there is also provided a smaller drive motor 29, having driving connection with the return chain 25. The motor 29 is preferably energized only upon completion of a drawing operation, being maintained in an inoperative condition throughout the duration of the actual drawing operations.

Figure 15:
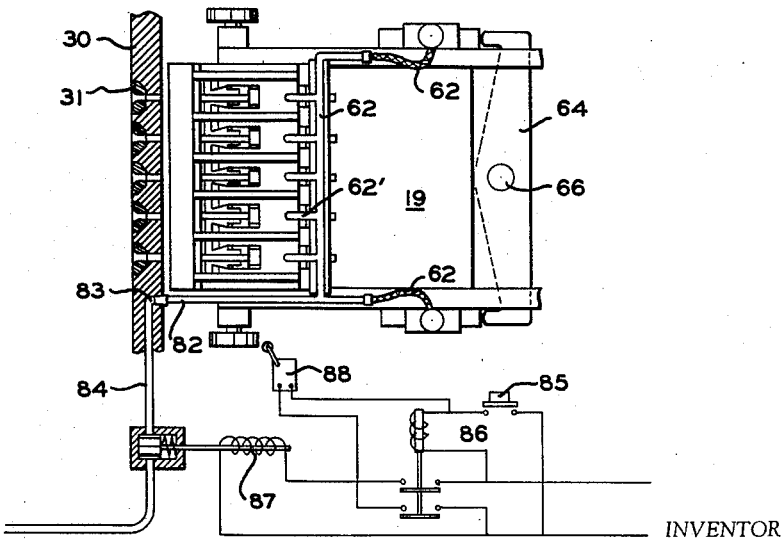
Figure 15 is a simplified schematic representation of an actuating and control system for operating the carriage mechanism of Figure 3.

At the left end of the main frame 10 of the drawbench is a die block 30 which is provided with a plurality of dies 31 (see Figure 15) positioned in side-by-side relation. The die block and dies may be of conventional construction, and are rigidly mounted on the frame 10.

Extending to the left of the die block 30 is an elongated mandrel-supporting table 32 which has means 33 at its extreme left end for anchoring and manipulating a plurality of mandrel rods 34 which are inserted within the openings of the dies during tube drawing operations, in accordance with usual practice. The mandrel anchoring means 33 includes certain novel features of my invention which will be more fully described.

In conventional tube drawing practice, a plurality of tube blanks are first positioned over the plurality of mandrels 34, and the leading ends of the blanks are inserted through the dies 31 and gripped by the draw carriage 19. The carriage 19 is then engaged with the draw chains 22 and 23 and moved away from the die block 30, carrying the tube blanks along with it. The blanks are thereby reduced to the dimensions of the annular opening between the die openings and the plug ends, not shown, of the mandrels 34.

To facilitate loading of the tube blanks onto the mandrels 34 there is provided above the main frame 10 a rack or platform 35—35' (Figure 10) which supports a plurality of blanks, not shown, arranged generally in end-to-end relation to the mandrels 34. Suitable pinch rolls or other means, not shown, may be provided to assist the operation of threading the blanks along the mandrel rods, as will be understood.

Figure 11:
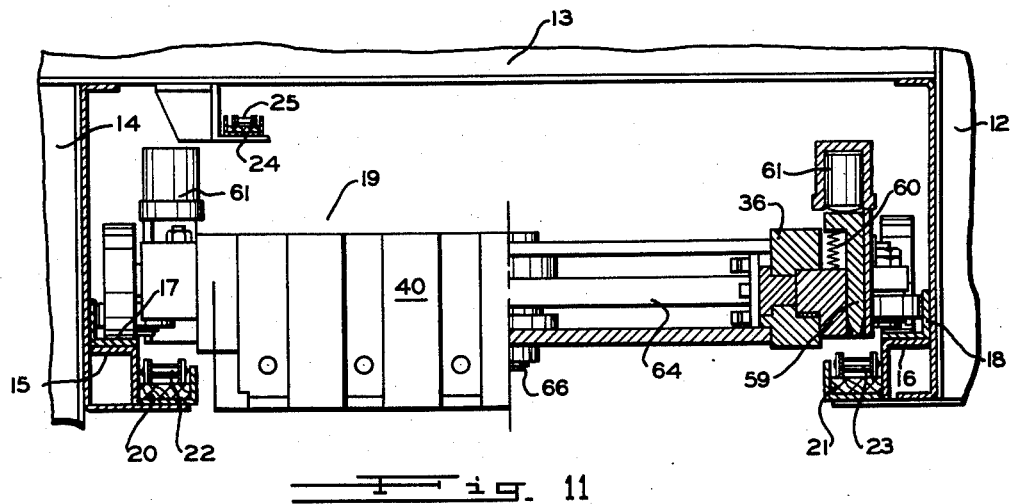
Figure 11 is an enlarged section view taken along line XI—XI of Figure 3, showing portions of the framework at Figure 10.

The draw carriage 19 of the present invention is comprised of a rigid frame, including spaced side members 36, which is provided with four supporting wheels or rollers 37, rotating about horizontal axes, and four guiding wheels 38, rotating about vertical axes. As shown in Figure 11 the wheels 37 and 38 are adapted to engage the horizontal and vertical surfaces respectively of the guiding and supporting tracks 17 and 18 whereby the carriage 19 may have free guided movement substantially throughout the length of the main frame 10 of the drawbench.

Figure 8:
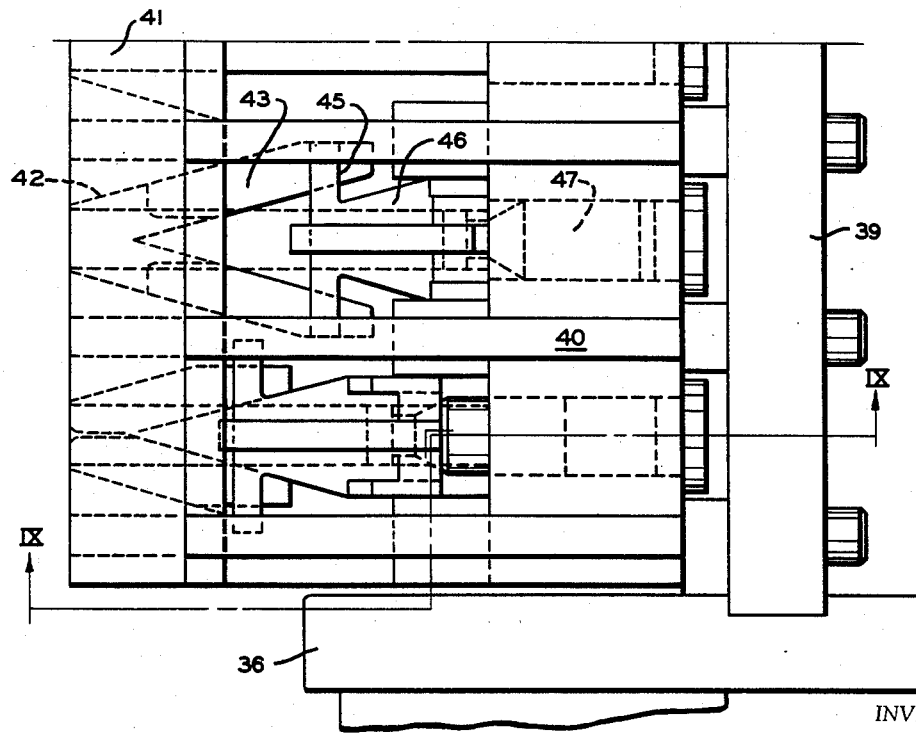
Figure 8 is an enlarged fragmentary top plan view of the carriage apparatus of Figure 3, showing the construction and operation of stock gripping devices incorporated therein.

Adjacent one end of the carriage 19 there is rigidly secured a heavy transverse member 39, to which, in turn, is secured a gripper head designated generally by the reference numeral 40. The gripper head 40, shown in detail in Figures 8 and 9, comprises a grip block member 41, which is preferably a heavy block of steel having formed therein a plurality of forwardly converging guide slots 42 for the reception of stock engaging grip bits 43, the arrangement being such that upon longitudinal movement of the bits 43 the same are caused to converge or diverge, as the case may be.

Figure 6:
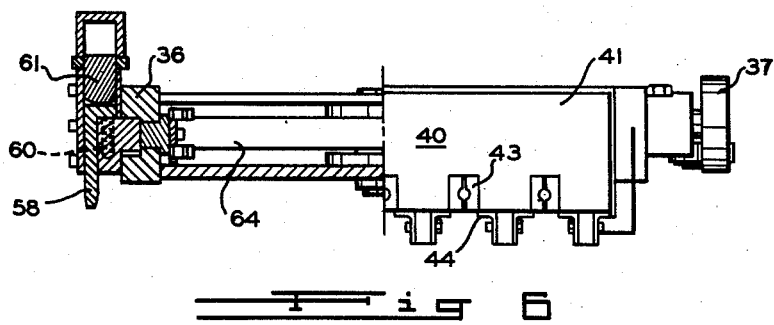
Figure 6 is a front elevation of the carriage of Figure 3, shown partly in section.

In acccordance with the preferred teachings of the invention the slots or channels 42 are open at the lower side of the grip block 41, there being provided a plurality of longitudinally disposed angle members 44 to partially enclose the opening thus formed to retain the bits 43 therein, while providing a substantial opening directly below the bits, as is desired. Figure 6 illustrates this arrangement.

Each of the bits 43 is provided with a transverse slot 45 in its upper surface for the reception of transverse arm portions of a slide block 46 which is guided for longitudinal movement in the gripper head 40. Upon forward movement, for example, of one of the slide blocks 46 the pair of grip bits 43 engaged thereby is also carried forward and caused to converge, the slots 45 in the bits providing for free transverse movement of the bits relative to the slide block associated therewith.

Figure 5:
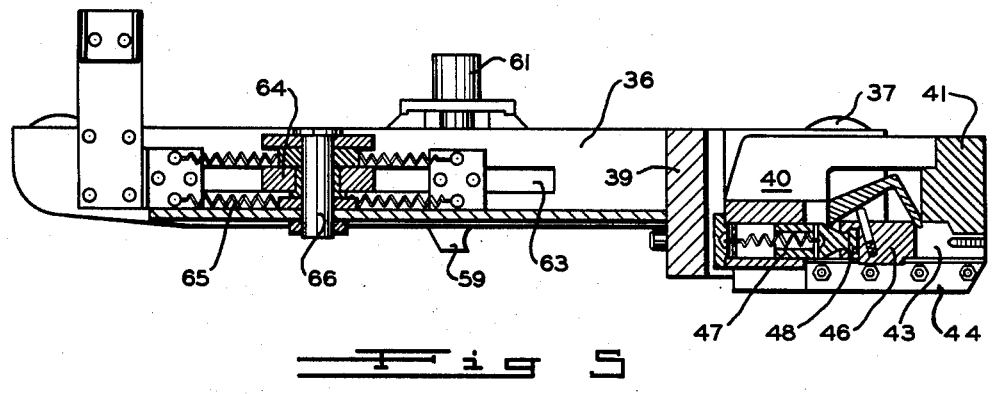
Figure 5 is a longitudinal section view taken along line V—V of Figure 3.

To actuate the slide blocks 46 I have provided a novel arrangement including longitudinally slidable plungers 47, having head portions 48 thereon which engage downwardly opening slots in the slide blocks 46, as shown in Figure 5, for example. The plungers 47 are slidably received in bores or cylinders 49, and are normally urged into retracted positions within such bores or cylinders by springs 50.

Communicating with each cylinder 49 is a single relatively large inlet passage 51 for air. And it will be noted in Figure 9 that the passage 51 opens into the cylinder 49 at a point substantially forward of its inner end. There is also provided, however, a relatively small pair of passageways 52 which communicates with the cylinder 49 near its extreme inner end and with the main passage 51. The arrangement, of course, is such that when the inner end of the plunger 47 covers the main passage 51 fluid must enter or exhaust through the relatively small passage 52. This is an important feature of the invention as will later become apparent.

In order to engage a tube blank in the gripper head 40 the forward end of the blank is inserted in one of the openings in the grip block 41, between the adjacent faces of a pair of grip bits 43, which, of course, are in an open or retracted position. Upon the application of air pressure to the cylinder 49 the plunger 47 is moved outwardly of the cylinder, carrying the slide block 46 and grip bits 43, and causing the latter to converge upon and tightly grip the end of the tube blank. Subsequently, when the drawing operation is begun, there is substantial tension on the blank, tending to draw the bits outwardly of the grip block 41, and therefore tending to cause the bits 43 to grip more tightly about the tube blank. Thus, it will be understood that as soon as a drawing operation is begun air pressure may be removed from the cylinder 49. And this is the preferred mode of operation in accordance with the teachings of the present invention.

Occasionally it may be necessary or desirable to change or replace grip bits in the drawbench apparatus, and it is of course desirable to do so in a minimum of time. Thus in accordance with the teachings of the present invention the slide block 46 is disconnectable from both the plunger 47 and grip bits upon limited upward movement. Observe in Figure 9, for example, that upon a small upward movement of the blocks 46 the transverse grip bit-engaging arms thereof are fully withdrawn from the recesses 45 in the upper surfaces of the bits 43, whereupon the latter may be readily withdrawn from the front face of the grip block 41.

As previously discussed, immediately following the completion of a drawing operation, as the trailing ends of the tube blanks clear the dies 31, the tubes snap forwardly with considerable force. As this occurs, the grip bits 43 are urged in a retracting direction sufficiently to release their grip upon the tube blanks, and thereafter the extended springs 50 continue to retract the plunger 47, slide block 46 and bits 43 to their respective initial positions.

Following their release from the bits 43, the tube blanks, having substantial unspent energy, travel forwardly at an increased velocity until the forward ends thereof engage the blunt front faces of the slide blocks 46. At this time the blocks 46 are moving in a retracting direction and yield freely, and therefore no substantial damage is done to the tubes upon initial contact thereof with the blocks 46. However, as will be understood, it is necessary to prevent the blocks 46 from bottoming while the tubes remain in engagement therewith. Accordingly, the present invention provides for the deflection of the forward ends of the tubes prior to the blocks 46 reaching such limit position.

For deflecting the forward ends of the tubes as above mentioned, there is provided with each slide block 46 an ejector or deflector device comprising an inverted U-shaped assembly 53—54 which is pivotally secured to the slide block 46, at the lower rear corner thereof, by a cam-like member 54, and which has a finger-like portion 53. The finger 53 is provided with a downwardly directed deflector portion 53' which is normally disposed above the blunt central portion of the front face of the block 46, and which is arranged upon downward pivotal movement of the finger 53 to wipe across the front face of the block 46 so that a tube abutting the same is forced downwardly, clear of the block 46, and in fact clear of the entire carriage 19. The tubes of course are forced out through the openings provided below the grip bits 43, and once clear of the carriage 19 the tubes will continue to travel forwardly while dropping into a rack or runout table wherein their remaining kinetic energy is harmlessly expended.

Figure 9:
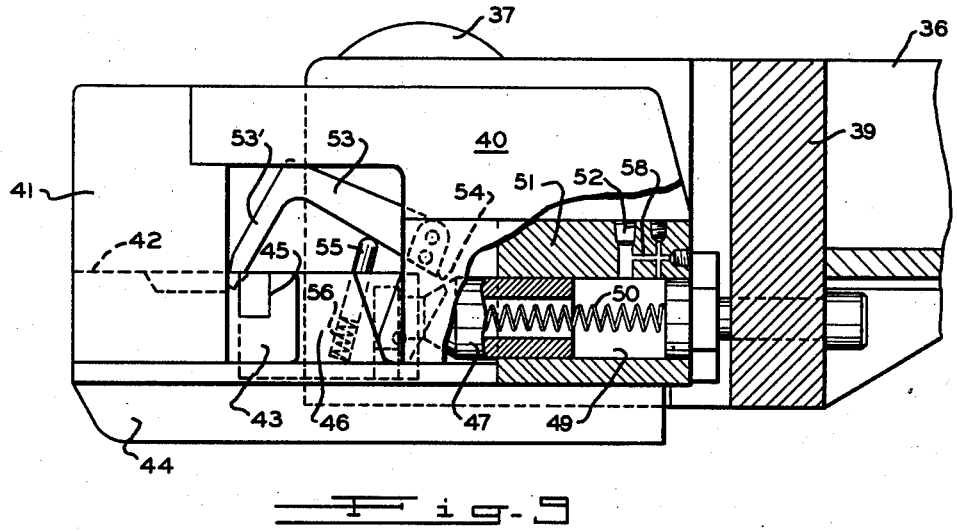
Figure 9 is a longitudinal section view taken along line IX—IX of Figure 8.

As shown in Figure 9, there is provided in each slide block 46 a small plunger 55 which is slidably received in the block 46 and urged upwardly by a spring 56. The plunger 55 engages the finger 53 so as to urge the same upwardly into an out-of-the-way position wherein the deflector portion 53' is positioned above the front face of the block 46.

In accordance with the teachings of the invention the gripper head 40 includes a heavy striker block 57 (housing the plungers 47) which has a hardened front face portion which is adapted to engage the cam-like member 54 upon sufficient rearward or retracting movement of the slide block 46. And the arrangement is such that upon continued retracting movement of the block 46 the the member 54 and finger 53—53' will be caused to pivot about its mounting whereby the deflector 53' passes across the front face of the block 46.

It will be observed in Figure 9 that as the slide block 46 moves to the right the plunger 47 closes off the main air passage 51 as the bracket comes into contact with the front face of the striker block 57. And the air trapped within the bore 49 is forced out of the restricted passage 52 at a much slower rate. The arrangement is such as to substantially cushion the movement of the slide block 46 so that the cam-like member 54 and striker block 57 do not become mutilated, and so that the various parts will not be subjected to unnecessary shock and wear through repeated operations. Further, it will be noted that the above described cushioning action begins to take place while the tube end is still in contact with the slide block so that the tube is decelerated somewhat before being released entirely, this being accomplished, however, without transmitting any sudden shock force to the tube which would tend to bend or buckle the same.

In order to effectively carry out drawing operations in the manner above described it is necessary that the area below the draw carriage 19, and its path of travel, be open so that upon discharge of the drawn tubes from the lower side of the carriage the tubes may fall freely into a receiving bin or the like. Accordingly, it has been determined most practical to drive the draw carriage from opposite sides, leaving the bottom area entirely clear. In accordance with the teachings of the present invention the drive chains 22 and 23 are positioned immediately below and adjacent the side edges of the carriage 19, as shown in Figure 11.

To engage the carriage 19 with the chains 22 and 23 for effecting a drawing operation I have provided a pair of retractible chain-engaging hooks 58 and 59 which are mounted at opposite sides of the carriage 19. The hooks 58 and 59 are normally urged upwardly, into a retracted position, by means of springs 60 (see Figure 6), while an air operated plunger assembly 61 is positioned above each one of the hooks for moving the same downwardly into an extended or chain-engaging position. Suitable conduit means 62 (see Figure 15) connect both plunger assemblies 61 so that upon application of air pressure to the conduit 62 the hooks 58 and 59 are simultaneously extended into chain-engaging position, causing the carriage 19 to move along its traverse in the manner desired. It is understood, of course, that in normal operation the chains 22 and 23 are driven continuously and synchronously in the same direction.

Although the drive chains 22 and 23 are driven synchronously at all times—and this may be assured by merely interconnecting the drive sprockets 26 therefor—various unforeseeable and/or uncorrectable factors may operate to cause the chains to move slightly out of phase with relation to each other. As will be readily understood, any tendency of the drive chains to move in out-of-phase relation will tend to cause an unbalanced drawing load to be applied to the carriage, unless the hooks themselves can be adjusted to compensate for such unbalance. And further, and perhaps more important, should the synchronous driving chains become as much as a half link out of phase one of the hooks might properly engage the chain, while the other might be forced down on top of the chain, between link openings, and would not engage at all.

Figure 3:
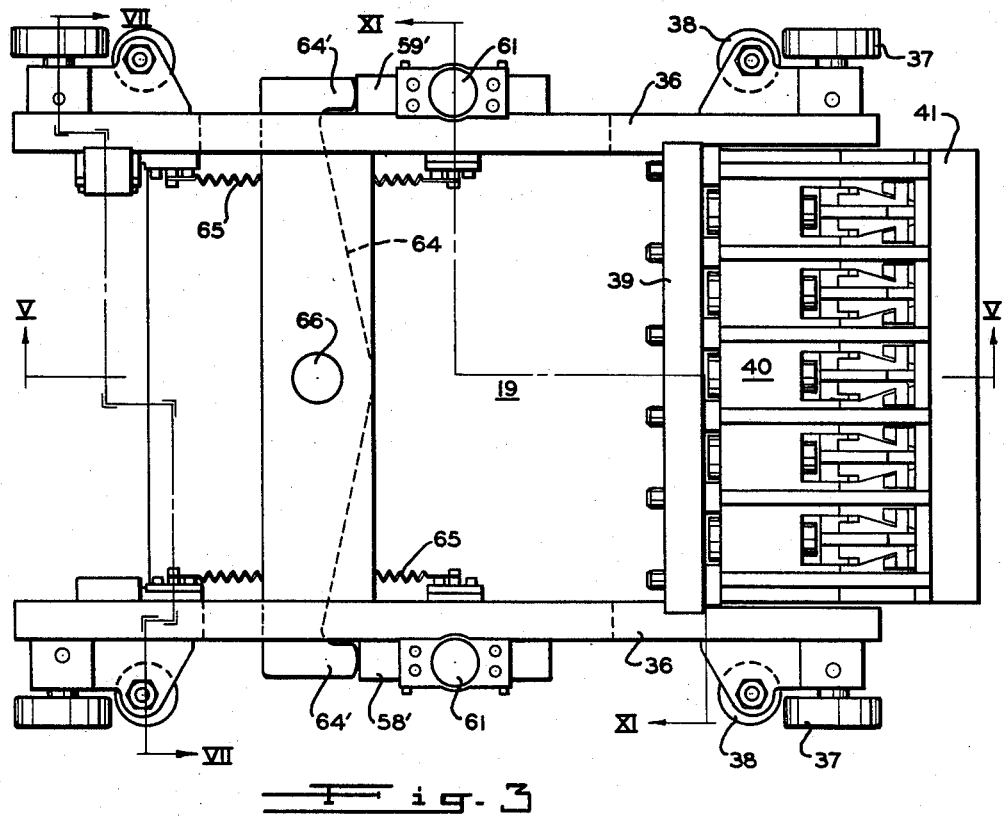
Figure 3 is a top plan view of the draw carriage constructed in accordance with the invention and incorporated in the bench assembly of Figure 1.

To obviate the above difficulties I have mounted the hooks 58 and 59 on slidable block assemblies 58' and 59' respectively, which are received in openings 63 in the carriage side members 36 and adapted for limited longitudinal sliding movement with respect to the last mentioned members. And in accordance with the teachings of the invention there is mounted on the carriage 19, for limited pivotal movement about a vertical axis, an equalizer bar or draw bar 64, having forwardly extending portions 64' at its outer edges. As shown in Figure 3, the forwardly extending portions 64' of the draw bar are positioned outwardly of the side members 36 of the carriage, and are adapted to abut the rear end faces of the hook mounting assemblies 58' and 59'. Normally, the assemblies 58' and 59' are drawn back against the draw bar 64 by means of suitable springs 65, and the springs are preferably of equal strength so that the apparatus assumes a symmetrical initial position, as shown in Figure 3. However, when the plunger assemblies 61 are energized to extend the hooks 58 and 59, and one hook engages prior to the other, the engaged hook will begin to move relative to the carriage, and as it does so it will cause the draw bar 64 to pivot about its axis 66, moving the other hook relative to the carriage in the opposite direction until such hook finally engages the chain. At this time both hook assemblies 58' and 59' are drawn tightly against the draw bar and drawing force is applied through the bar and is transmitted to the carriage 19 through the pivotal mounting 66 for the draw bar. Thus, it will be understood that any out-of-phase relation of the chain is compensated by relative longitudinal movement between the hook assemblies 58' and 59', and unbalanced forces and other undesirable effects are wholly avoided.

In the drawing of tubes it is common to first apply the tube over a mandrel having a plug-like end portion. During the drawing operation the side walls of the tube are forced through the reduced annular space between the die and the mandrel plug, and the final product assumes the inside diameter of the die as its outside diameter and the diameter of the plug as its inside diameter. The mandrel plug is of course positioned within the aperture of the die during the drawing operation, and therefore, in order to apply a new tube blank to the mandrel it is first necessary to withdraw or retract the mandrel from the die aperture, following which the mandrel may be raised or moved to the side for the "loading" of a new blank thereon. Subsequently, when the next drawing operation is initiated, the mandrel must again be inserted into the die aperture. And in some instances it is desirable to position the mandrel plug slightly in front of the die opening, though aligned therewith, so that the draw may be initiated under a lighter load, the mandrel being fully inserted once the draw is under way. Also, in many cases the longitudinal positioning of the mandrel with respect to the die opening is rather critical, and accurately adjustable means must be provided for properly locating the mandrel.

Figure 12:
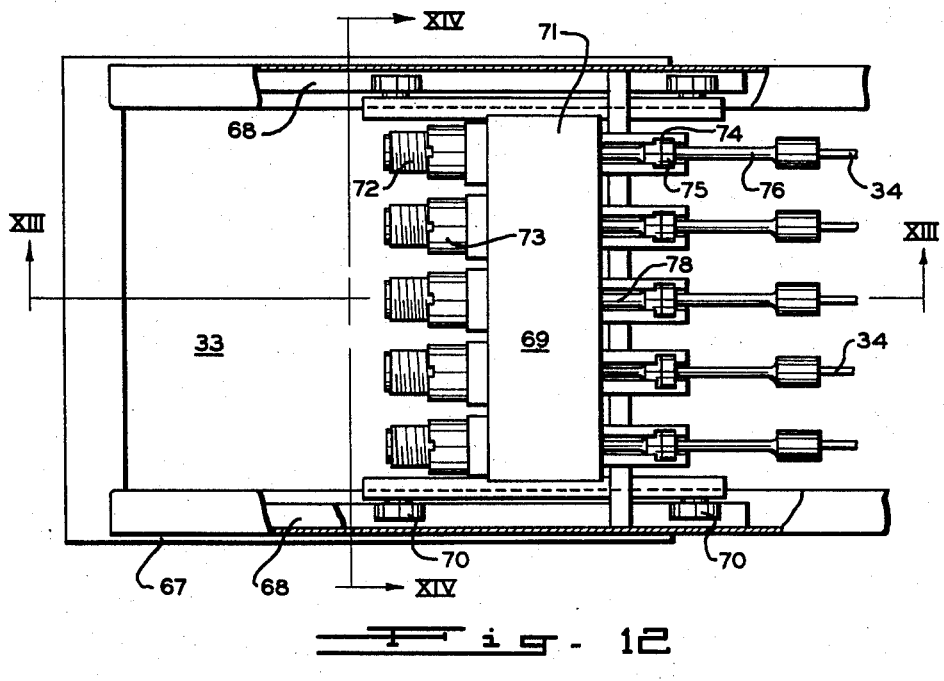
Figure 12 is a fragmentary top plan view of my drawbench assembly, showing details of the mechanism employed for anchoring and manipulating a plurality of mandrel rods used in connection with the drawbench.

In accordance with the teachings of the present invention I provide for the manipulation of a plurality of mandrels in the manner above described in a highly simplified manner. Figures 12–14 illustrate the anchoring and manipulating device 33 for the mandrels, and as shown therein there is provided a frame 67 having spaced longitudinal trackways 68 which guide and support a mandrel carriage 69. The mandrel carriage 69 is a rigid structure having a plurality of wheels or rollers 70 engaging the trackway 68, and comprised primarily of a heavy anchor block 71. The anchor block 71 is provided with a plurality of large diameter longitudinal bores for the slidable reception of sleeve-like members 72 which extend through the anchor block 71, in the manner shown in Figure 13. There are five such sleeve-like members 72 in the illustrated apparatus, to accommodate a like number of mandrels.

In accordance with the teachings of the invention the sleeve-like members 72 are threaded throughout a substantial portion of their length for engagement with threaded adjusting nuts 73, the latter being rotatable with respect to the anchor block 71 while being locked against longitudinal movement with respect thereto. The arrangement is such that upon rotation of the nuts 73 the members 72 may be adjusted longitudinally with respect to the anchor block 71, such adjustment being individual with each sleeve member 72 as will be readily observed.

At the forward end of each of the sleeve members is an upwardly opening recess 74 which receives the enlarged head portion 75 of a mandrel connector 76, the latter having connection at its forward end with a mandrel 34 as indicated in Figure 12, for example. The inside face of the head portion 75 is spherically contoured, as is the abutting face of the end portion of the cylindrical sleeve-like member 72, the arrangement being such that the mandrel connector 76 and sleeve-like retaining member 72 therefor may be slightly misaligned without causing undue stress in any of the parts of the apparatus.

Received within each of the sleeve-like mandrel retaining members 72 is a spring 77 and a spool or plunger 78 which is engaged and urged forwardly by the spring 77 into abutting engagement with the mandrel connector 76. The spools 78 thus urge the mandrels 34 into their forwardmost positions at all times, while there is provided a yieldable retracting movement, individual to each of the mandrels, as is desired when the loaded mandrels are first inserted in the die openings preparatory to a drawing operation.

For loading tube blanks or workpieces onto the mandrels 34 the plurality thereof are first moved into a retracted position with respect to the die block 30. And in accordance with the teachings of the present invention this is accomplished by means of a single fluid cylinder 79 which is rigidly mounted on the frame 67. The cylinder 79 has an operating rod which engages the mandrel carriage 69, as shown in Figure 13, so that upon proper application of pressure to the cylinder 79 the entire carriage is shifted rearwardly with respect to the frame. The wheels 70 and trackways 68 of course support the carriage 69 throughout such movement. With the carriage 69 in a retracted position the mandrels 34 may be raised at their forward ends up to the level of the loading rack 35' so that worpieces may be easily threaded over the mandrels. And it is contemplated that any suitable power means may be provided for raising the mandrels as above described, and/or sliding the tubes over the upraised mandrels. Such arrangements are known in the art.

After the tube blanks or workpieces are properly threaded over the mandrels the same are lowered into normal positions and the cylinder 79 is energized to move the carriage 69 in a forward direction, tending to insert the mandrels 34 into the die openings.

Generally, before the draw has begun, it is difficult to insert the loaded mandrels properly within the die opening, and in the illustrated apparatus the mandrels may retract against the springs 77 as the carriage is moved against a forward abutment stop, as defined by a rigid wall 80, forming part of the frame 67. Then, when the tube blanks begin to move through the die the mandrels will be drawn into the die opening by friction, to a predetermined limit position as determined by the longitudinal adjustment of the sleeve-like retaining members 72. Also, in some cases, it may be desired to stop the forward movement of the carriage 69 short of its forward limit position until the drawing operation is under way, and this may be accomplished through suitable control of the cylinder 79 as will be understood.

Figure 7:
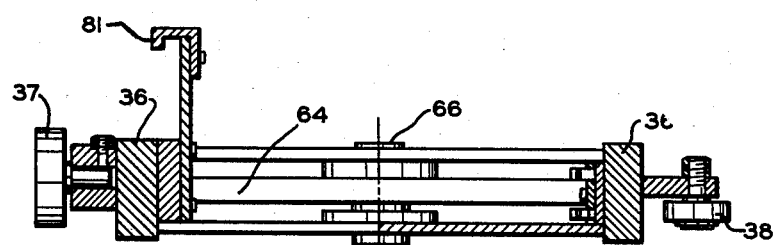
Figure 7 is a section view taken along line VII—VII of Figure 3.

In the operation of my drawbench apparatus a plurality of tube blanks or workpieces are first loaded onto the mandrels and inserted through the die openings as above described, the workpieces usually being provided with pointed end portions which extend through the dies for engagement by the grip bits. Next, the draw carriage 19 is moved up to the die block 30 by operation of the return chain 25, which engages a member 81 (see Figure 7) mounted on the carriage.

As the carriage 19 moves up to the die block 30 a longitudinally extending conduit member 82 having a quick-detachable end connection is received in a socket 83 in the die block, which establishes communication between a fluid supply conduit 84 and conduits 62, which serve both the hook-actuating cylinders 61 and the plungers 47, the latter members being served through a plurality of conduits 62' leading from conduit 62 to the air passages 51.

When it is desired to begin the draw, switch 85 is closed which energizes a relay 86 and a solenoid valve 87, admitting fluid to conduits 82, 62 and 62'. The relay 86 is provided with a hold-in or locking circuit, including a limit switch 88 whereby upon momentary closure of the switch 85 the relay 86 remains energized until the switch 88 is opened.

As valve 87 opens, fluid pressure is admitted simultaneously to the grip-actuating plungers 47 and the hook-actuating cylinders 61, whereupon the workpiece ends are tightly gripped and the carriage 19 is engaged with the chains 22 and 23. The carriage immediately begins to move away from the die block 30, withdrawing, as it does so, the conduit 82 from the die block socket 83. And simultaneously with this, the limit switch 88 is tripped by the carriage 19 so that the valve 87 is deenergized and closed.

Figure 4:
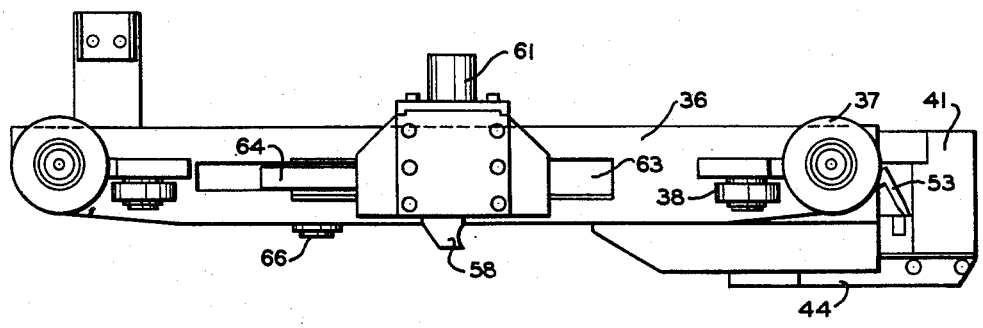
Figure 4 is a side elevation of the carriage of Figure 3.

At this time there is no further fluid pressure upon either the grip-actuating plungers 47 or the hook-actuating cylinders 61. However, it will be observed that the application of drawing force by the grip bits 43 merely tends to draw the same more tightly into engagement with the workpieces so that fluid pressure is no longer necessary for this purpose. And likewise, as will be observed in Figure 4, for example, the bight portion of each of the hooks 58 and 59 is such that the extreme lower end portions of the hooks are received beneath the cross bars of the chains 22 and 23, preventing upward movement of the hooks while drawing force is being applied thereto, and thereby rendering fluid pressure on the cylinders 61 no longer necessary.

As the drawing operation is completed the workpieces snap free of the dies 31 with substantial force, which tends to move the grip bits 43 in a releasing direction and also to momentarily relieve the pressure of the chains 22 and 23 upon the hooks 58 and 59. The hooks are thereupon retracted upwardly by springs 60 so that the carriage 19 is no longer engaged to the draw chains, and the finished tubes are released from the bits and ejected away from the carriage by fingers 53, in the manner heretofore described.

In the illustrated apparatus there is provided a receiving rack 89 (Figure 10), along the front side of the drawbench frame, in which the finished tubes are deposited following a completed drawing operation. The rack 89 is positioned in offset relation to the carriage pass to facilitate unloading of the finished tubes. And a sloping runout table 90 is located directly below the carriage pass to receive the tubes as they drop from the carriage and direct the same into the receiving rack 89.

To return the carriage to its initial position the return motor 29 is energized, and the return chain 25 draws the carriage back to the die block 30.

It is of course contemplated that during the progress of a drawing operation a new set of workpieces will be readied for loading on the rack 35'. And in many cases, during the return movement of the carriage 19, the mandrels 34 will be retracted, loaded and repositioned in readiness for a subsequent drawing operation. Therefore, the invention contemplates the provision of suitable automatic means in addition to or in place of the manual switch 85 whereby upon movement of the carriage into loading position in front of the die block 30 valve 87 will be automatically opened to momentarily actuate the grip bits and draw hooks.

The advantages of the invention should now be manifest. There is disclosed a novel and highly improved carriage actuating arrangement which is particularly adapted for incorporation into a multi-tube drawbench assembly, and particularly wherein means are provided for deflecting the completed tubes downwardly away from the carriage following a drawing operation. Thus, the invention provides for the application of drawing force through a pair of widely spaced synchronously moving draw chains, there being provided a novel arrangement for engaging the draw carriage and chains whereby unbalance of forces is prevented and proper engagement of the carriage is assured.

There is also provided by my invention a novel arrangement including a plurality of independent air-operated grip bit assemblies whereby a plurality of workpieces may be simultaneously engaged upon the application of air pressure to the draw carriage assembly. And any irregularities in the workpieces are absorbed individually in the separate gripping assemblies. Moreover, there is provided in connection with each grip bit assembly an ejector device which operates upon rearward or retracting movement of the grip bits to eject the workpiece retained therein away from the carriage. The ejector is operated by striking a fixed abutment, upon retracting movement of the grip bits; and the fluid operated bits are very advantageous in this combination in that their retracting movement may be gradually decelerated or cushioned to prevent unnecessary wear on the ejector mechanism and other parts, and also to decelerate somewhat, without the application of any damaging force, the movement of the finished tubes, following their passage through the dies.

The above assembly is further advantageous with respect to the simplicity of its operation. Thus, there may be provided a simplified arrangement for automatically connecting the grip bits to a source of fluid pressure upon movement of the carriage into starting position. And although the connection is broken when the carriage begins to move away from the die block, the grip bits are firmly seated by the tension force of the draw and the fluid pressure is no longer necessary. The same of course applies with respect to the chain engaging hooks 58 and 59.

Of particular importance is the herein described arrangement of apparatus for actuating the draw carriage in a working direction. By providing rectilinearly movable hook means (movable normally toward and away from the draw chain or chains), as distinguished from pivotally mounted hook means, it is possible to apply the heavy drawing force required to the drawing carriage without causing the chains to rise up out of their tracks to thereby apply a heavy downward force to the draw carriage as in prior apparatus. Substantial friction and wear is thus avoided and, of course, the power requirements become less.

The above specifically described embodiment of the invention should be considered as illustrative only, and reference should therefore be had to the appended claims in determining the scope of the invention.

I claim:

1. In a draw carriage having a grip block mounting a pair of divergently related and movable grip bits, a slide block mounted in said carriage for movement along an axis generally coincident with the central axis of said pair of grip bits, said slide block being connected to said pair of grip bits for opening and closing the same and also having a blunt end for being engaged by the leading end of the workpiece upon completion of a draw and the consequent opening of said grip bits, power means to move said slide block in a grip bit closing direction, means to cushion the movement of said slide block in the opposite direction, an ejector comprising a U-shaped member pivotally connected at the free end of one of its legs to said slide block and having the other of its legs overhanging said blunt end but normally spaced out of the path of travel of said workpiece, and a fixed abutment on said carriage for rotating said ejector upon movement of said slide block in a grip bit opening direction to cause said second mentioned leg to strike the leading end portion of said workpiece to deflect the same outwardly of the blunt end of said slide block.

2. In a drawbench having a suspended track for mounting a draw carriage whereby stock pieces may be discharged by gravity after drawing, a draw carriage having a horizontally disposed grip block, a pair of grip bits, means mounting said grip bits in diverging relation in the lower wall of said grip block whereby the interstice between said grip bits is open to the space below in any position of said grip bits, a slide block on said carriage engaging said grip bits to operate the same in either closing or opening directions and having a blunt end surface forming an end wall of said interstice, and an ejector movable into said interstice upon continued movement of said slide block in a grip bit opening direction to strike the leading end portion of a workpiece which has moved into engagement with said blunt end upon completion of a draw whereby said end portion is deflected downwardly and away from said carriage.

3. Apparatus according to claim 2 further including power means to move said slide block in a grip bit closing direction, and means to cushion the movement of said slide block as the same approaches the end of its stroke in a grip bit opening direction.

4. Apparatus according to claim 3 further characterized in that said ejector comprises a member pivotally connected at one point to said slide block and adapted to contact at another point a fixed abutment on said carriage whereby said member is rotated as said block approaches the end of its grip opening stroke to thus move said ejector downwardly.

References Cited in the file of this patent

UNITED STATES PATENTS

| | | |
|---|---|---|
| 535,534 | Dollman | Mar. 12, 1895 |
| 763,711 | Berghof et al. | June 28, 1904 |
| 1,496,137 | Sundh | June 3, 1924 |
| 1,816,484 | Holmes | July 28, 1931 |
| 2,224,838 | Smith | Dec. 10, 1940 |
| 2,404,234 | Kerr | July 16, 1946 |
| 2,554,998 | McIlvried et al. | May 29, 1951 |
| 2,630,910 | Turner | Mar. 10, 1953 |
| 2,685,961 | Schuler | Aug. 10, 1954 |
| 2,731,141 | Kerr | Jan. 17, 1956 |

FOREIGN PATENTS

| | | |
|---|---|---|
| 595,470 | Great Britain | Dec. 5, 1947 |
| 608,001 | Great Britain | Sept. 8, 1948 |